Patented Sept. 18, 1928.

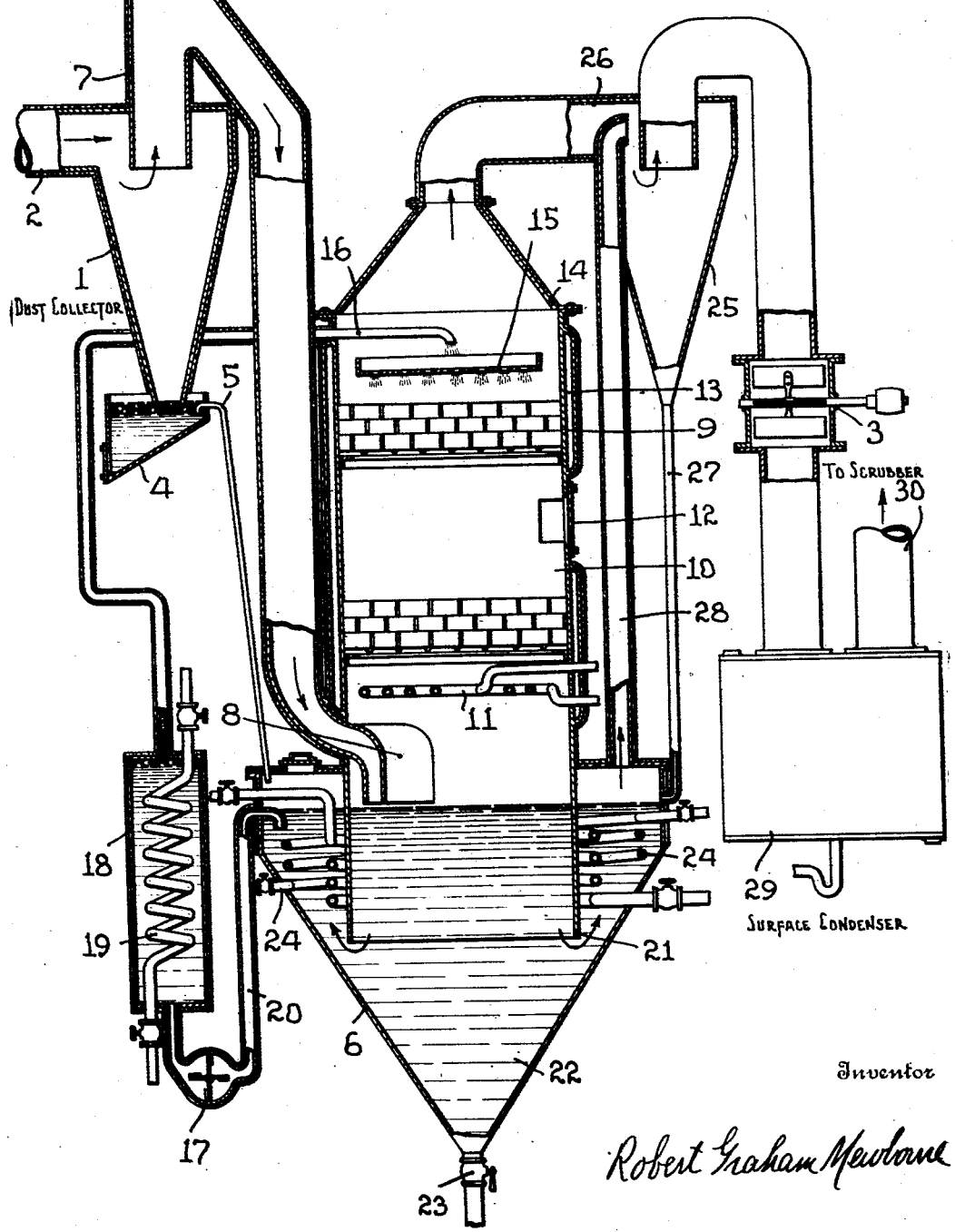

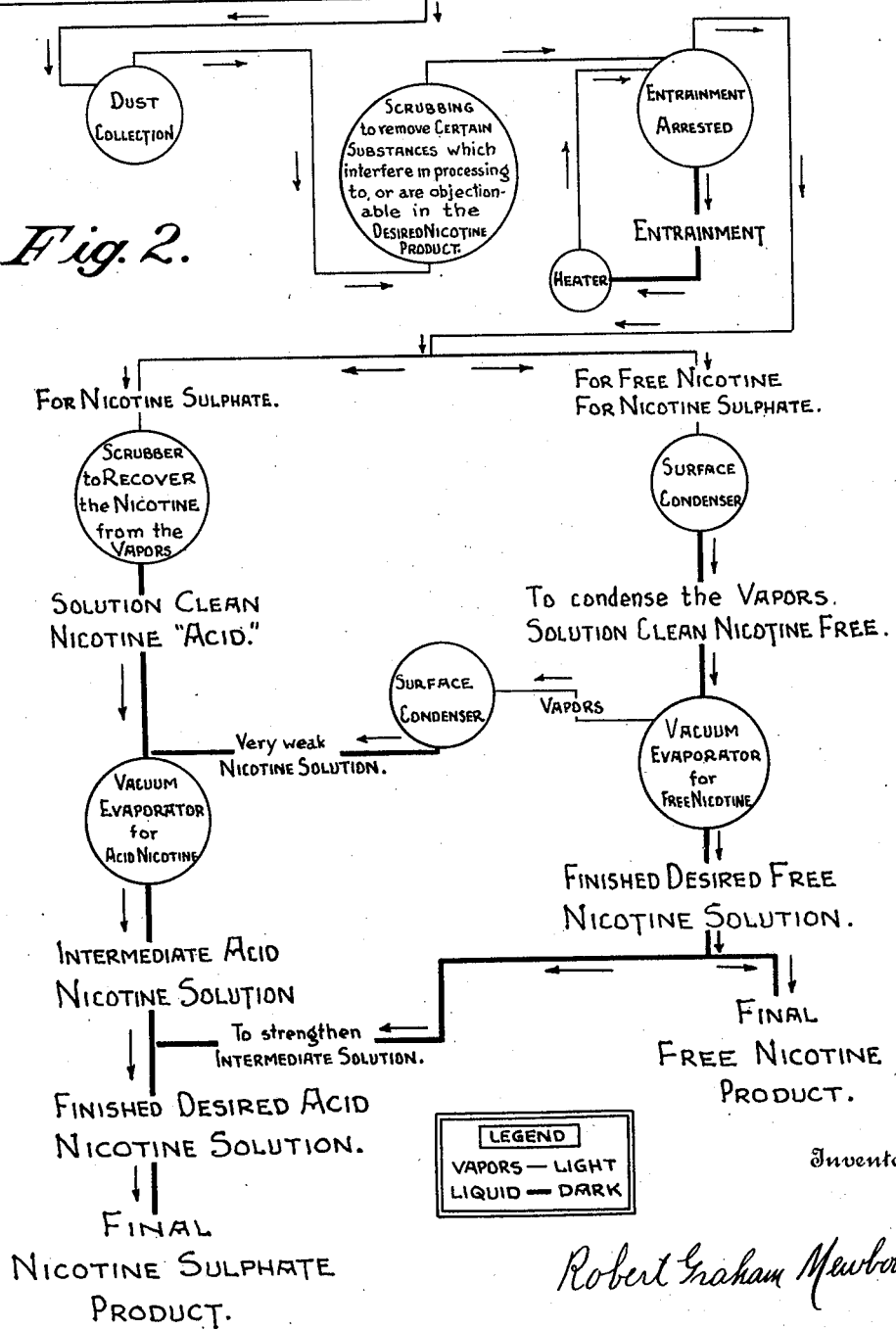

UNITED STATES PATENT OFFICE.

ROBERT GRAHAM MEWBORNE, OF CLARKESVILLE, TENNESSEE.

METHOD FOR CLEANSING NICOTINE VAPORS.

Application filed February 19, 1924. Serial No. 693,948.

This invention relates to a novel process and apparatus for obtaining preliminary or intermediate products containing the desired ingredient or ingredients free from substances which interfere in further processing the preliminary products to, or are objectionable in, the desired product by removal of these substances from the vapors containing the desired ingredient or ingredients; the invention being especially intended for treating vapors containing nicotine, but it is applicable for other materials.

More specifically, this invention consists in treating vapors containing nicotine, and other undesirable substances with reagents which precipitate, coagulate, collect or otherwise render the said substances amenable to withdrawal, from the vapors without materially affecting the nicotine in the vapors and then recovering a substantially pure nicotine product.

The invention also provides by the process and apparatus the means for production of substantially pure nicotine products at a considerable reduction in cost as a result of a higher yield, simplicity of operation and saving of time than has hitherto been provided.

In the prior art for production of nicotine where the alkaloid is recovered from plants as tobacco containing the same, or from extracts thereof by means of vapors either aqueous vapors as steam, the more volatile vapors of organic compounds or the gases resort is had to the combined vapor pressures of the carrier vapor and that of nicotine to cause separation of the desired nicotine and then cooling the vapors carrying such nicotine to await further processing. In such cases the processes are imperfect because impurities are carried over into the condensate by reason of either mechanical suspension, entrainment, solution of vapors or combination of all of them.

Production of free nicotine or nicotine salts such as nicotine sulphate from such condensates which is now practically the only intermediate source on the market, entails tedious and costly processes which obviously by the numerous steps also involves losses at each stage of purification of the nicotine product.

Production of a marketable nicotine product such as results where crude nicotine sulphate is produced as the intermediate product does not solve the problem for not only are the same undesirable substances encountered in the resultant product so as to render the same objectionable for commercial use but the loss attendant to purification to the purer nicotine is very great due not only to volatilization of nicotine while concentrating to effect separation of these undesirable substances but also of the ammonium and other salts always present.

Vacuum concentration or evaporation aside from being tedious and costly presents the usual difficulties because of the large percentage of impurities present resulting in overheating discoloration of the product and volatilization of the nicotine.

By my process the difficulties above outlined are simply and effectively remedied. This process in its preferred form may be carried out in conjunction with processes and apparatus as described in Patents Nos. 896,124 and 1,156.609 for producing the initial vapor containing nicotine. However other means may be employed to separate the nicotine from the tobacco as by a vapor carrier of a volatile organic compound or an inert gas.

The vapors containing nicotine preferably steam vapors before any condensation or as nearly after their generation in the aforementioned process are first treated by suitable dust collecting means to separate any solid matter carried in the vapor.

The vapors now still carry matters suspended, entrained or dissolved besides the nicotine. What these ingredients are I am not prepared to say nor are they definitely known. They may also vary in nature and constitution and kind with the variation in processes of extraction and temperatures used. These ingredients which I shall call impurities which if condensed with the nicotine in the vapor cause the interference in the further processing of the collected preliminary product or by their presence discolor to an objectionable degree the desired final product after such processing, and the final products due to these substances held in solution is for certain purposes entirely unfit for use. For the sake of brevity and for the purposes of this disclosure I shall hereafter designate such interfering ingredients as impurities, and will so refer to them in the claims forming a part hereof.

By treating the vapors and maintaining the conditions such as to prevent the nicotine in the vapor from condensing, I have found that I can produce nicotine products either free nicotine or nicotine sulphate which only require concentration to any desired degree and produce products of remarkable degree of purity.

The vapors containing nicotine are submitted to a scrubbing treating consisting preferably of sodium hydroxide solution of proper concentration to absorb the impurities referred to. A concentration of 10 to 30% sodium hydroxide will do, though concentrations as low as 2½% has been found to operate. Other alkalies as potassium hydroxide alkali carbonates of sodium or potassium and other reagents which react with or absorb the impurities may be used. The reagent may be heated to prevent condensation of the nicotine and the temperature conditions are maintained such as to prevent such condensation. Heat may for this reason be supplied but it is possible if the incoming vapors are sufficiently hot or the pressures sufficiently low, that such added heat may not be necessary.

Intimate mixture of the reagent and the vapors will remove substantially all the impurities and these are carried off in the reagent. The vapors carrying the free nicotine are then cooled to recover the nicotine. Where steam has been used condensation may be resorted to to recover free nicotine or scrubbing with sulphuric acid to recover the nicotine as a sulphate may be used. Preferably both means are used in combination in successive order. The products so recovered need only concentration to any desired degree to produce the final marketable product. Where both nicotine sulphate and free nicotine are recovered blending of the two may be resorted to for any desired purpose.

For the sake of brevity I shall refer to nicotine products as including free nicotine and nicotine sulphate and when I specify pure nicotine or nicotine products, I mean to also include those recovery products free from the impurities mentioned and which require substantially only concentration or separation from the vapor carrier to produce the final market product.

Preferably my process may be carried out in the apparatus described in the accompanying drawings forming a part of this specification wherein Fig. 1 is a sectional vertical elevation of the apparatus. Fig. 2 is a schematic representation of the process.

Referring to Fig. 1 wherein the apparatus is illustrated, for economy in operation certain parts of this apparatus are insulated as so indicated, while other portions where heat conservation is not required such insulation is omitted. Vapors are led into cyclone dust collector 1 through opening 2 (which is the connection to the source of vapor supply apparatus), by suction created by the fan 3, where suspended solids usually collectible by such equipment, are collected and removed through the water-sealed outlet 4, having a sealed overflow pipe 5 for conveying condensate there formed to tank 6. From 1 the vapors pass through conduit 7, whose outlet 8 is constricted whereby the velocity of the vapors is increased and arranged such that the vapors impinge on the surface of the solution in 6 whereby further suspended matters are removed from the vapors. The vapors are then redirected upwardly to a heat jacketed chamber in which steam is preferably used, where scrubbing surfaces 9 are provided in the form of staggered thin vertical sections of brick work or equivalent material arranged in spaced units affording spaces 10 for heat units, a steam coil 11 being shown, and provides in combination with suitable openings 12, means for readily cleaning the chamber. The steam jacket 13, and auxiliary heating coil 11 with provision for installing others in 10, provide means for maintenance of the desired temperature in the chamber. This temperature is preferably not below 100° C, lower temperatures being permissible depending upon the condition of the vapor and the pressures of operation.

The vapors now in chamber 14 which includes scrubbing surfaces, spaces and heating elements previously described, in their upward movement therein are countercurrently brought into intimate contact by means of scrubbing surfaces 9 with an aqueous solution of sodium hydroxide which reacts on the impurities as specified other than nicotine contained in the vapors rendering them amenable to separation, and the wet scrubbing surfaces by contact, separate or collect these substances along with other suspended solids from the vapors, and all these are removed by gravitation or otherwise to tank 6, and freshly wet scrubbing surfaces result by the continuous gravity flow of the solution of sodium hydroxide or any other suitable reagent from distributing pan 15, which is supplied by pipe 16 and pump 17 through heater 18 provided with heating coils 19 for further heating the reagent solution which flows to pump 17 through sealed overflow pipe 20, the outlet member of tank 6.

The sodium hydroxide solution or other reagent in tank 6, containing suspended matters collected by and held in suspension in such reagent in its passage through 14 is purified by sedimentation by means of the extension 21 of the shell 14, in combination with the cone shape of 6, and position of the intake of the sealed overflow pipe 20, which baffle the flow of the hot reagent solution from within, to without the cylinder 21, this bringing the hot solution in a cooler zone 22, where due to increased density, and gravity, the suspended matters settle and are withdrawn by means of valve 23. The temperature of the purified reagent solution, now without the cylinder is restored by means of steam coil 24 and auxiliary heater 19 and is again circulated through the system addition being made from time to time of the reagent through suitable means not designated on the drawing.

The vapors, now cleansed, enter cyclone collector 25, through conduit 26, where entrainment is arrested, and the collected material returned along with any condensation by means of pipe 27 to tank 6, where by means of steam coil 24, volatilization is effected and the vapors returned to 26 through conduit 28. Vapors now free from entrainment are drawn through fan 3 and discharged into surface condenser 29, where all, or any portion of the vapors are condensed, for recovery of nicotine in a preliminary or intermediate nicotine product.

The non-condensable gas or any portion desired of the nicotine vapors that are not condensed are discharged through vent 30 to a scrubber for further treatment to recover the nicotine in a preliminary or intermediate nicotine product and the recovery of other valuable constituents contained in the vapors.

Fig. 2 is self-explanatory and illustrates the complete process mentioned from the source of nicotine to the final nicotine products as set forth above.

I also contemplate as included in my invention, not only treating what would be regarded strictly as vapors but such conditions of a fluid medium wherein liquids containing nicotine are brought into a sufficiently fine state of subdivision to react with comparative ease with a stream containing the reagent solution, preferably sodium hydroxide, to separate the impurities in the reagent solution and liberate nicotine, and maintain temperature conditions for its ready withdrawal. Such conditions are most nearly present wherein a spray or mist of a nicotine containing extract is used as the source of the nicotine in this process and in the claims where I have specified vapors containing nicotine I mean to include such fine subdivision, spray or mist even to the condition closely resembling highly wet steam.

I also contemplate such conditions in the reactive zone of my process where there is a temporary solution and revolatilization of the nicotine carried in the vapors to be treated and where in the claims I state that conditions are maintained to prevent condensation of the nicotine I also mean to provide for the above mentioned operating conditions either accidental or because it is so found desirable by providing the condition of temperature to permit the existence of the nicotine in the vapor phase.

It will be understood that the invention is not to be limited to the specific form or arrangement of parts in the apparatus shown and that the process though it be closely related to such apparatus may be carried out in other apparatus of widely different forms and the apparatus features of the invention embodied in other constructions suitable for carrying out the process defined by the claims.

What I claim is:—

1. The process which comprises treating a stream of vapors containing nicotine and impurities to a stream of alkali solution, maintaining the temperature to prevent condensation of the nicotine and recovering nicotine from the vapors so treated.

2. In the process of obtaining nicotine products the steps which comprise separating impurities from vapors containing nicotine and then recovering a substantially pure nicotine product.

3. In the process of obtaining nicotine products the steps which comprise separating impurities from vapors containing nicotine, condensing the vapors so treated and then recovering merely by concentration of the condensate.

4. In the process of obtaining nicotine products the steps which comprise separating impurities from vapors containing nicotine, condensing and scrubbing the vapors so treated and recovering merely by concentration of the condensate.

5. The process of obtaining nicotine products which comprises maintaining vapors containing nicotine in the vapor phase while removing impurities contained therein and then recovering a substantially pure nicotine product.

6. In the process of obtaining nicotine products the steps which comprise treating a vapor containing nicotine and impurities in the vapor phase to remove the impurities while maintaining temperature conditions to prevent condensation of the nicotine.

7. A process as in claim 6 and thereafter condensing and scrubbing the vapors so treated to recover nicotine products.

8. A process as in claim 6 and thereafter condensing the vapors to recover the nicotine products.

9. A process as in claim 6 and thereafter scrubbing the vapors so treated to recover the nicotine products.

10. The process of recovering substantially pure nicotine from vapors containing the same together with impurities by scrubbing such vapors with a reagent to remove the impurities while maintaining a temperature to prevent substantial condensation of the nicotine and thereafter condensing and scrubbing the so treated vapors to recover the nicotine product.

11. A process as in claim 10 wherein the reagent is an alkali solution.

12. The process of recovering nicotine substantially free from impurities which interfere in further processing the preliminary products to or are objectionable in, the desired product, which comprises treating vapors containing nicotine and said impurities to remove said impurities.

13. The process as in claim 12 wherein the treatment is carried out while maintaining conditions to permit nicotine to remain in the vapor phase.

14. The process as in claim 12 wherein the impurities are removed by causing the vapors to impinge against reagents to remove said impurities.

15. The process as in claim 12 wherein the impurities are removed by causing streams of such vapors to impinge against a reagent capable of removing said impurities and countercurrently maintaining streams of such reagent against streams of said vapor.

16. The process of recovering nicotine substantially free from impurities which interfere in further processing the preliminary products to or are objectionable in, the desired product, which comprises treating vapors containing nicotine and said impurities to remove said impurities, by causing streams of such vapors to impinge against a reagent capable of removing said impurities and countercurrently maintaining streams of such reagent against streams of said vapor, while maintaining conditions to permit nicotine to remain in the vapor phase.

17. The process of recovering nicotine substantially free from impurities which interfere in further processing the preliminary products to or are objectionable in, the desired product, which comprises treating vapors containing nicotine and said impurities to remove said impurities, by causing streams of such vapors to impinge against a reagent capable of removing said impurities and counter-currently maintaining streams of such reagent against streams of said vapor, while maintaining temperatures to prevent nicotine from condensing.

18. The process of recovering nicotine substantially free from impurities which interfere in further processing the preliminary products to or are objectionable in the desired product, which comprises treating vapors containing nicotine and said impurities to remove said impurities including the steps of causing streams thereof to impinge against an alkali solution capable of removing said impurities and countercurrently maintaining streams of such solution against streams of said vapor.

19. The process of recovering nicotine substantially free from impurities which interfere in further processing the preliminary products to or are objectionable in, the desired product, which comprises treating vapors containing nicotine and said impurities to remove said impurities, by causing streams of such vapors to impinge against a reagent capable of removing said impurities and counter-currently maintaining streams of such reagent against streams of vapor, while maintaining the temperature at over 100° C.

20. The process of recovering nicotine substantially free from impurities which interfere in further processing the preliminary products to or are objectionable in, the desired product, which comprises treating vapors containing nicotine and said impurities to remove said impurities, by causing streams of such vapors to impinge against a reagent capable of removing said impurities and counter-currently maintaining streams of such reagent against streams of vapor, while maintaining the temperature at over 100° C., continuously removing the impurities collected from the reaction zone in the liquid phase and continuously removing the nicotine therefrom in the vapor phase.

21. In the process of recovering nicotine products from aqueous vapors containing nicotine as produced from products including impurities, the steps which consist in condensing and scrubbing the vapors and then concentrating to produce substantially pure nicotine products.

22. The process of producing nicotine products which consists in removing the nicotine from products containing the same in the presence of steam as a carrier, removing the impurities from the carrier, leaving substantially pure nicotine therein, acid scrubbing such carrier and its components, condensing and concentrating the same to produce substantially pure nicotine products.

23. In the process of purifying nicotine, the steps which comprise washing a vapor containing nicotine under conditions of control without substantial condensation of the nicotine contained in the vapor.

24. The process which comprises treating vapors containing nicotine together with impurities to a purifying action and recovering substantially pure nicotine products from the so treated vapor.

25. The process of recovering nicotine substantially free from impurities which interfere in further processing the preliminary products to or are objectionable in, the desired product, which comprises treating vapors containing nicotine and said impurities to remove said impurities, by causing streams of such vapors to impinge against a reagent capable of removing said impurities, while maintaining conditions to permit nicotine to remain in the vapor phase.

26. The process of recovering nicotine substantially free from impurities which interfere in further processing the preliminary products to or are objectionable in, the desired product, which comprises treating vapors containing nicotine and said impurities to remove said impurities, by causing streams of such vapors to impinge against a reagent capable of removing said impurities, while maintaining temperatures to prevent nicotine from condensing.

27. The process of recovering nicotine substantially free from impurities which interfere in further processing the preliminary products to or are objectionable in, the desired product, which comprises treating vapors containing nicotine and said impurities to remove said impurities, by causing streams of such vapors to impinge against an alkali solution capable of removing said impurities.

28. The process of recovering nicotine substantially free from impurities which interfere in further processing the preliminary products to or are objectionable in, the desired product, which comprises treating vapors containing nicotine and said impurities to remove said impurities, by causing streams of such vapors to impinge against a reagent capable of removing said impurities, while maintaining the temperature at over 100° C.

29. The process of recovering substantially pure nicotine products from vapors containing the same, together with impurities, by causing streams of such vapors to impinge against a liquid carrier, while maintaining temperature conditions to prevent nicotine from condensing.

30. In the process of purifying nicotine, the steps which include washing a carrier in the mixed liquid and vapor phase containing nicotine, with an alkaline reagent to remove impurities and condensing the resulting product.

31. In the process of purifying nicotine, the steps which include washing a carrier in the mixed liquid and vapor phase containing nicotine under conditions of control, tending to prevent substantial condensation of nicotine vapors.

32. The process of recovering substantially pure nicotine products from a carrier containing the same together with impurities by causing streams of such carrier in a mixed liquid and vapor phase to impinge against a scrubbing liquid while maintaining temperature conditions to prevent substantial condensation of nicotine.

33. The process of recovering substantially pure nicotine products from a carrier containing the same together with impurities which includes causing streams of such carrier and its contents to move countercurrently to an alkaline reagent in the liquid phase while maintaining temperature conditions to prevent substantial condensation of nicotine.

34. In the process of purifying nicotine, the steps which include washing a carrier in the mixed liquid and vapor phase containing nicotine to remove the impurities thereof under temperature conditions above that which will cause condensation of the ingredients in the vapor phase.

35. In the process of purifying nicotine, the steps which include washing a carrier in the mixed liquid and vapor phase containing nicotine with an alkali solution to remove the impurities thereof under temperature conditions above that which will cause condensation of the ingredients in the vapor phase.

36. In the process of purifying nicotine, the steps which include washing a carrier in the mixed liquid and vapor phase containing nicotine with an alkaline solution to remove the impurities thereof, and removing the impurities in the alkaline solution.

37. In the process of purifying nicotine, the steps which include moving a stream of a carrier in the mixed liquid and vapor phase containing nicotine countercurrently and in intimate admixture with an alkaline solution to remove the impurities thereof in said alkaline solution.

38. In the process of purifying nicotine, the steps which include moving a stream of a carrier in the mixed liquid and vapor phase containing nicotine countercurrently and in intimate admixture with an alkaline solution to remove the impurities thereof in said alkaline solution while maintaining temperature conditions above that which will cause condensation of the ingredients in the vapor phase.

ROBERT GRAHAM MEWBORNE.